July 17, 1928.
G. E. PRENTICE
FASTENER
Filed May 7, 1925
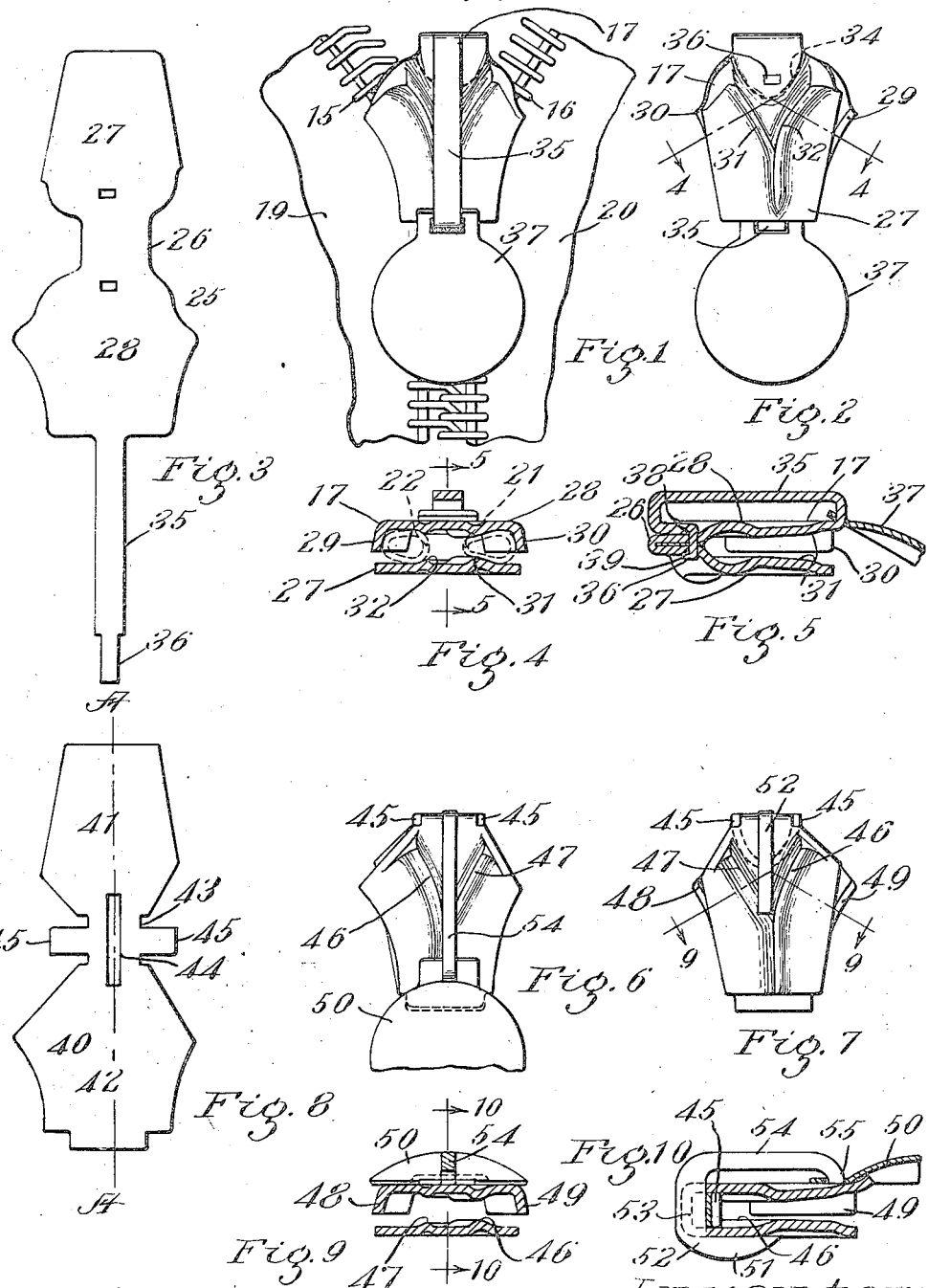
Inventor:
George E. Prentice
by Roberts, Roberts & Cushman
Att'ys.

Patented July 17, 1928.

1,677,408

UNITED STATES PATENT OFFICE.

GEORGE E. PRENTICE, OF BERLIN, CONNECTICUT.

FASTENER.

Application filed May 7, 1925. Serial No. 28,569.

This invention relates to interlocking fasteners of the kind in which series of complementary mating or interlocking elements are arranged along the opposed edges of a gap or opening in a garment, shoe, receptacle, or other article made of such flexible material as textile fabric, leather or rubber, and more particularly to sliders for such fasteners adapted to close the gap and interlock the complementary fastener members on movement in one direction and on movement in the opposite direction to unlock the fastener members and open the gap.

In certain types of fasteners of this general character it is common to decrease the thickness of the fastener from front to rear as by flattening the fastener elements of the opposed series, and the outer ends of the elements may also be bent out of the plane of the main body of such elements or otherwise shaped to enable them more positively to interlock with one another. Under such circumstances the opposite rows of interlocking members are somewhat dissimilarly shaped, and the principal object of the present invention is to provide an improved slider which is particularly adapted to co-operate with fastener elements of the modified character mentioned and which will very positively and effectually guide the same into interlocking relationship.

In the accompanying drawings,

Fig. 1 is a front elevation, partly broken away, of a fastener provided with a slider embodying a preferred form of the invention;

Fig. 2 is a view of the opposite side of the slider;

Fig. 3 is an elevation of a blank from which the preferred form of slider is formed;

Fig. 4 is a transverse section on the lines 4—4 of Fig. 2;

Fig. 5 is a longitudinal vertical section on the line 5—5 of Fig. 4;

Fig. 6 is a front elevation of a modified form of slider;

Fig. 7 is a view from the opposite side;

Fig. 8 is an elevation of a blank from which the second form of slider is constructed.

Fig. 9 is a section on the line 9—9 of Fig. 7; and

Fig. 10 is a longitudinal section on the line 10—10 of Fig. 9.

The fastener as herein illustrated consists essentially of two helically wound springs 15 and 16, respectively, whose convolutions constitute the fastening elements, and an actuating slider 17. While the fastener elements constituting the series disposed at opposite sides of the opening, may, as here shown, form the spires of a continuous coil, they may, as is also common, be formed as independent rings or otherwise without departing from the present invention.

The springs 15 and 16 are coiled in opposite directions and may conveniently be made of wire of approximately .029 inch in diameter wound upon a one-eighth inch mandrel to form open helices. The wire employed should be stiff enough effectually to prevent distortion in use and preferably resistant to corrosion. Wire having the characteristics of nickel-silver wire is well adapted for the purpose.

The springs 15, 16 may be fastened in any suitable manner to strips of material 19 and 20 respectively. The springs 16 are flattened so that their individual convolutions or loops are of generally oval or egg shape with their longer axes lying substantially in the plane of the material to which they are fastened. The convolutions of the spring 15 are more acutely flattened at their outer ends 21 and these ends are opposed to the outwardly projecting larger ends 22 of the convolutions of the spring 16. The projecting smaller end 21 of each convolution of the spring 15 is bent out of the general plane of the convolution as indicated in Fig. 1 so that when engaged between adjacent convolutions of the opposite spring these bent ends tend to hook over the latter convolutions and thereby enhance the interlocking effect of the convolutions.

The slider 17 is preferably formed from a blank 25 (Fig. 3). This blank comprises a central portion 26 and wider end portions or wings 27 and 28. By bending the blank, these wings are brought into parallelism whereby to form the front and rear plates of the slider. The wings 27 and 28 are asymmetrical with respect to a line extending longitudinally of the blank and the wing 28 is wider than the wing 27. The edges of at least one wing, for example the wing 28, are bent inwardly to provide marginal guide flanges 29 and 30. The wings 27 and 28 are shaped as by means of suitable dies, to form upon each of them a generally Y-shaped rib, each rib comprising branches 31 and 32.

The ribs upon the opposed wings project toward each other and with the flanges 29 and 30 define converging guide channels of unlike cross section and closely conforming to the shape of the fastener elements with which they respectively engage so as snugly to embrace the fastener elements and thus positively to hold and position such elements as the latter are moved toward or away from each other. The part 26 of the blank is folded upon itself as shown in Fig. 5, and where the folds merge into the respective wings they provide curved surfaces 34 disposed between the arms of the respective Y-shaped ribs and these opposed curved surfaces combine to form a divider member or guide element spaced from but cooperating with the divergent arms of the ribs to position the convolutions of the opposed series.

A narrow strip 35 projects from the end of the wing 28 and terminates in a tongue 36. This strip is bent in the manner indicated in Fig. 5 to furnish an attaching loop for the handle or pull 37. The tongue 36 at the free end of the strip 35 passes through openings 38 and 39 in the front and rear walls of the slider and is preferably bent over or upset at its end and soldered in position so as to tie the several parts together. Solder may also be wiped into the space between the opposed curved surfaces 34 to provide a smooth and continuous guide for the fastener elements.

When the slider 17 is moved upwardly the fastener elements of the opposed series engage one another progressively, entering between and interlocking with each other. The Y-shaped ribs guide the convolutions substantially all of the time that they are within the slide and the convolutions are thus moved smoothly into engagement with each other. By virtue of the fact that pull 37 is free to move from a position at one end of the slider, as shown in Fig. 5, to a position at the opposite end thereof, the application of force to the slider can be effected most advantageously and the point of application of the tractive force changes, depending upon the result desired to be accomplished. The asymmetrical shape of the slider permits cooperation with the differently formed convolutions 15 and 16 and the ribs 31 and 32 guide the adjacent ends of the convolutions and maintain the narrow ends of the convolutions 15 central with respect to the convolutions 16.

The slider illustrated in Figs. 6 to 10, is in many respects similar to that shown in Figs. 1 to 5, but involves certain structural differences. This slider is made from a blank 40 which comprises wing portions 41 and 42 respectively adapted to constitute the front and rear portions of the finished slider. These wings are connected by a relatively narrow neck portion 43 having a central longitudinal slot 44 and narrow laterally projecting tabs 45 at its opposite sides. The wings 41 and 42 are asymmetrical with respect to a longitudinally extending line passing through the center of the slot 44, the portion to the left of such a line as viewed in Fig. 8 being somewhat wider than the portion to the right, and the wing 42 is wider than the wing 41.

In the finished slider it is the portion to the left of this line which cooperates with the series of more elongate elements 15. The wings 41 and 42 are pressed or stamped or otherwise treated to form upon them projecting Y-shaped ribs comprising the divergent arms 46 and 47, the arms 46 being slightly the more pronounced since they serve to guide the narrow end portions 21 of the convolutions 15. The wing 42 is provided with lateral guide flanges 48 and 49. After the formation of the Y-shaped ribs and the guide flanges 48 and 49, the wings 41 and 42 are brought into parallelism with each other, bending taking place at the junction of each wing with the neck 43. The tabs 45 are now turned in between the wings 41 and 42, their free extremities being curved as substantially to meet, thus providing a suitable separator guide for the convolutions of the series 15 and 16. To strengthen the slide and to permit attachment thereto of a pull 50 a generally U-shaped element 51 is soldered or otherwise secured thereto. This element 51 comprises a portion 53 fitting into the slot 44, and generally parallel portions 52 and 54, the former engaging and being soldered to the outer surface of wing 41 and the latter being parallel to but spaced from the outer surface of the wing 42, its free end being brought into engagement with the latter wing and soldered thereto if desired. The spaced relation of the portion 54 with respect to the wing 42 permits the pull 50 to slide freely for a substantial distance longitudinally of the slider.

In each form of slider disclosed there is provided means for guiding the opposed fastener elements of the two series into engagement with each other, and for positively holding such fastener elements so that they cannot tilt or twist relatively to one another. The ribs projecting towards each other on the front and back plates position the narrow extremities 21 of the elements 15 midway between the plates, and as the upper arms of the ribs on each plate merge into one the fastener elements are guided smoothly into interlocking relation. The flanges at the outer edges of the wings serve not only to move the convolutions toward each other but cooperate with the ribs on the plate in positively guiding the same.

While there are described above two forms which the invention may assume in practice and which are well adapted to accomplish the objects stated, it will be understood that the invention may assume other forms or be substantially modified without departing from its spirit or the scope of the appended claims.

I claim:

1. A slider for fasteners of the kind comprising opposed series of interlocking fastener elements arranged along each of the opposed edges of material bordering on an opening or gap, the elements of each series constituting coils of a continuous helical spring, the springs being flattened so that the individual coils or fastener elements are of non-circular, elongate form with their longer axes in the plane of the material to which they are attached, the coils of one spring being shaped differently from those of the other, said slider having parts defining converging channels, the respective channels being adapted to receive and to guide the fastener elements of the respective series, said channels being unlike in section and conforming closely to the shape of the respective fastener elements with which they engage whereby positively to position opposed elements as they approach the point of interengagement.

2. A slider for fasteners of the kind comprising opposed series of interlocking fastener elements arranged along each of the opposed edges of material bordering on an opening or gap, each series consisting of substantially egg-shaped loops with their longer axes in the plane of the material, the smaller ends of the loops of one series being arranged to interlock with the broader ends of the loops of the other series, said slider comprising spaced substantially flat front and rear plates, one at least of said plates having inwardly directed marginal flanges and one at least of said plates having an inwardly struck rib, said rib with said flanges defining converging guide channels for the reception of the fastener elements of the respective series, the channels being unlike in section and conforming respectively to the shape of the elements with which they engage whereby positively to position the elements of the two series as they approach the point of interengagement.

3. A slider for fasteners of the class described comprising spaced parallel front and rear plates integrally united at one end by a narrower neck portion doubled upon itself to bring its points of union with the respective front and rear plates into juxtaposition, said plates having inwardly projecting members defining guide channels for fastener elements, a narrow strip integrally secured at one end to the free end of the front plate and extending in spaced parallel relation to the front face of said plate, said strip having its other extremity attached to said neck portion, and a handle device slidable along the parallelly spaced portion of said strip.

4. A slider for fasteners of the class described comprising spaced parallel front and rear plates connected at one end and free at the other, said plates having inwardly projecting oppositely disposed members defining converging guide channels for fastener elements, a narrow strip secured at one end to the free end of the front plate and extending outwardly from the front face of said plate, then being bent to extend parallel to the front of the plate, then again being bent and passing through aligned openings in the front and rear plates near their point of union, the extremity of said strip being deflected to engage the rear face of the slider.

5. A slider for fasteners of the class described comprising spaced substantially parallel front and rear plates having means defining guide channels for fastener elements, said channels in transverse section, being broader at one end than at the other, the broader end of one channel section being opposed to the narrow end of the other channel section.

6. A slider for fasteners of the class described comprising spaced parallel front and rear plates having means defining guide channels for fastener elements, said channels being of substantially oval shape in section with the smaller end of one channel opposed to the broader end of the other channel.

7. A slider for fasteners of the class described comprising opposed series of independent fastener elements arranged along each of the opposed edges of material bordering an opening or gap, each series consisting of substantially oval loops with their longer axes in the plane of the material, the smaller ends of the loops of one series being arranged to interlock with the broader ends of the loops of the other series, said slider comprising spaced substantially parallel front and rear plates having means defining converging guide channels for the reception of the fastener elements of the respective series, each of said channels being substantially egg-shaped in transverse section with the longer axis of the sections in the plane of the material bordering the gap, the smaller end of one channel being opposed to the broader end of the other channel.

Signed by me at New Britain, Connecticut this seventeenth day of April, 1925.

GEORGE E. PRENTICE.